United States Patent [19]
Kelderman

[11] Patent Number: 5,829,848
[45] Date of Patent: Nov. 3, 1998

[54] TRACK SUSPENSION APPARATUS FOR VEHICLES OF VARIOUS TYPES

[75] Inventor: Gary L. Kelderman, Oskaloosa, Iowa

[73] Assignee: AgTracks, Inc., Mt. Vernon, Iowa

[21] Appl. No.: 740,823

[22] Filed: Nov. 4, 1996

Related U.S. Application Data

[63] Continuation-in-part of Ser. No. 493,944, Jun. 23, 1995, abandoned.

[51] Int. Cl.$^6$ .................................................. B62D 55/08
[52] U.S. Cl. ............................ 305/15; 305/130; 305/135; 305/143
[58] Field of Search .................................... 305/124, 125, 305/129, 130, 134, 135, 138, 142, 143, 150, 151, 169, 195, 199, 15; 301/150.1, 111, 35.62; 180/9.21, 9.26, 418

[56] References Cited

U.S. PATENT DOCUMENTS

| | | |
|---|---|---|
| 1,038,569 | 9/1912 | Grover . |
| 2,105,917 | 1/1938 | Herrington . |
| 2,111,587 | 3/1938 | Goldstine . |
| 2,328,777 | 9/1943 | Bolliger ...................................... 305/15 |
| 2,467,947 | 4/1949 | Skelton . |
| 2,496,136 | 1/1950 | Smith . |
| 2,673,616 | 3/1954 | Moores ................................ 180/418 X |
| 2,719,062 | 2/1955 | Arps . |
| 3,082,044 | 3/1963 | Klemm et al. . |
| 3,163,249 | 12/1964 | Ledohowski . |
| 3,166,357 | 1/1965 | Vachon et al. .................... 301/35.62 X |
| 3,361,482 | 1/1968 | Stevens ................................. 301/35.62 |
| 3,412,820 | 11/1968 | Wachholz . |
| 3,458,214 | 7/1969 | West . |
| 3,689,123 | 9/1972 | Barbieri . |
| 3,774,708 | 11/1973 | Purcell et al. . |
| 3,826,388 | 7/1974 | Oldenberg et al. . |
| 3,834,771 | 9/1974 | Firstenberg ................................ 305/15 |
| 3,841,424 | 10/1974 | Purcell et al. . |
| 3,885,641 | 5/1975 | Harris . |
| 3,938,606 | 2/1976 | Yancey . |
| 4,227,749 | 10/1980 | Hesse . |
| 4,313,516 | 2/1982 | Terry . |
| 4,406,501 | 9/1983 | Christensen . |
| 4,448,273 | 5/1984 | Barbieri .................................. 180/9.21 |
| 4,458,954 | 7/1984 | Haas . |
| 4,708,218 | 11/1987 | Makela . |
| 4,817,746 | 4/1989 | Purcell et al. . |
| 4,865,141 | 9/1989 | Gey ........................................ 180/9.26 |
| 4,936,639 | 6/1990 | Pohjola . |
| 4,944,562 | 7/1990 | Garrison . |
| 4,953,919 | 9/1990 | Langford . |
| 5,113,958 | 5/1992 | Holden ................................. 180/9.1 X |
| 5,273,126 | 12/1993 | Reed et al. . |
| 5,316,381 | 5/1994 | Isaacson et al. . |
| 5,343,960 | 9/1994 | Gilbert . |
| 5,368,115 | 11/1994 | Crabb . |
| 5,452,949 | 9/1995 | Kelderman . |

FOREIGN PATENT DOCUMENTS

| | | |
|---|---|---|
| 0017187 | 1/1988 | Japan . |
| 0189170 | 4/1958 | Sweden . |
| 1263573 | 10/1986 | U.S.S.R. . |

OTHER PUBLICATIONS

Farm Show, Nov.–Dec. 1994, vol. 18, No. 6, p. 27.

*Primary Examiner*—Russell D. Stormer
*Attorney, Agent, or Firm*—Jansson, Shupe, Bridge & Munger, Ltd.

[57] ABSTRACT

A track suspension apparatus for a vehicle having a frame and a continuous flexible track is provided and is turned by a drive wheel operably attached to the frame for engaging and driving the flexible track. Structure is provided for rotatably mounting the drive wheel to the vehicle and an adaptive device is associated with the mounting structure is provided for permitting the mounting structure to be attached directly to a first vehicle at times and, alternatively, to a second vehicle at other times.

3 Claims, 5 Drawing Sheets

TRACK SUSPENSION APPARATUS FOR VEHICLES OF VARIOUS TYPES

CROSS-REFERENCE TO RELATED APPLICATIONS

This application is a Continuation-in-Part of application Ser. No. 08/493,944, filed Jun. 23, 1995, now abandoned the disclosure of which is hereby incorporated by reference in its entirety.

STATEMENT REGARDING FEDERALLY SPONSORED RESEARCH OR DEVELOPMENT

Not Applicable

AUTHORIZATION PURSUANT TO 37 C.F.R. §1.71 (d) (e)

A portion of the disclosure of this patent document, including appendices, may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to a track suspension apparatus for vehicles and, more particularly, to an apparatus which permits such track suspension apparatus to be interchangeable among various types of vehicles.

2. Description of the Related Art

Various track suspension devices have been devised for vehicles such as agricultural tractors, combines, etc. These track suspension devices typically are manufactured differently depending upon whether they are to be attached to an axle having a groove therein such as that typically found on an agricultural tractor and a different device or attaching mechanism is provided for track suspension systems which are to be attached to agricultural combines, field choppers, cotton pickers or similar devices which have a hub rigidly attached to each end of the drive axles. Accordingly, there is a need for a track suspension apparatus which can easily and quickly be attached to either a vehicle with a hubless axle or a vehicle having a hub attached thereto. Also, there is a need for a universal track suspension apparatus which can be quickly and easily attached to any one of a number of different hub structures.

Those concerned with these and other problems recognize the need for an improved Track Suspension Apparatus for Vehicles of Various Types.

BRIEF SUMMARY OF THE INVENTION

The present invention relates generally to a track suspension apparatus for a vehicle having a frame. A continuous flexible track is provided and is turned by a drive wheel operably attached to the frame for engaging and driving the flexible track. Structure is provided for rotatably mounting the drive wheel to the vehicle and an adaptive device is associated with the mounting structure is provided for permitting the mounting structure to be attached directly to a grooved axle of a first vehicle at times and, alternatively, to a hub rigidly affixed to an axle of a second vehicle at other times. Also, there is a need for a universal track suspension apparatus which can be quickly and easily attached to any one of a number of different hub structures.

An object of the present invention is to provide an improved track suspension apparatus.

Another object of the present invention is to provide such track suspension apparatus of a type which has adaptive device for permitting the suspension apparatus to easily and quickly be changed between different vehicles.

Therefore, an object of the present invention is the provision of an improved Track Suspension Apparatus for Vehicles of Various Types.

BRIEF DESCRIPTION OF THE SEVERAL VIEWS OF THE DRAWINGS

Other objects, advantages, and novel features of the present invention will become apparent from the following detailed description of the invention when considered in conjunction with the accompanying drawings, wherein.

DETAILED DESCRIPTION OF THE INVENTION

Figure 1:
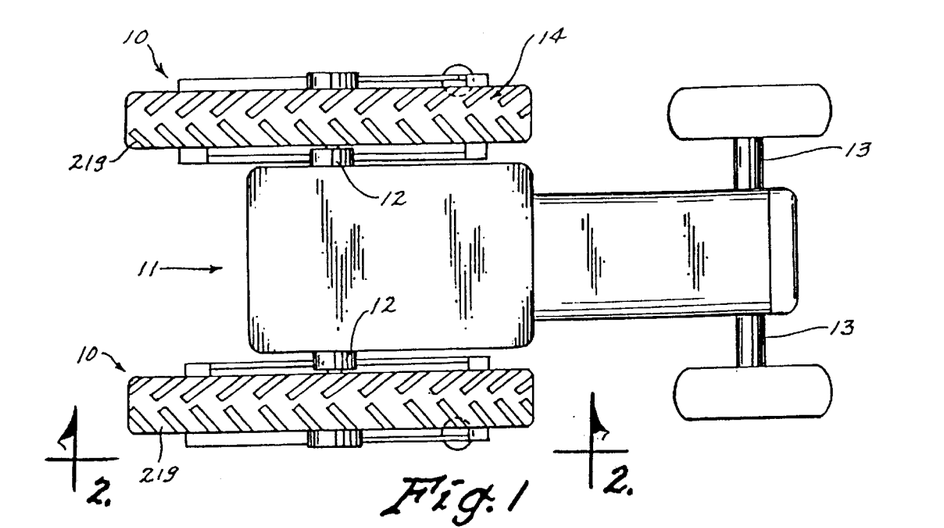
FIG. 1 is a top plan view of an agricultural tractor having a track suspension apparatus of the present invention attached to the rear driving axle thereof.
Figures 7, 8:
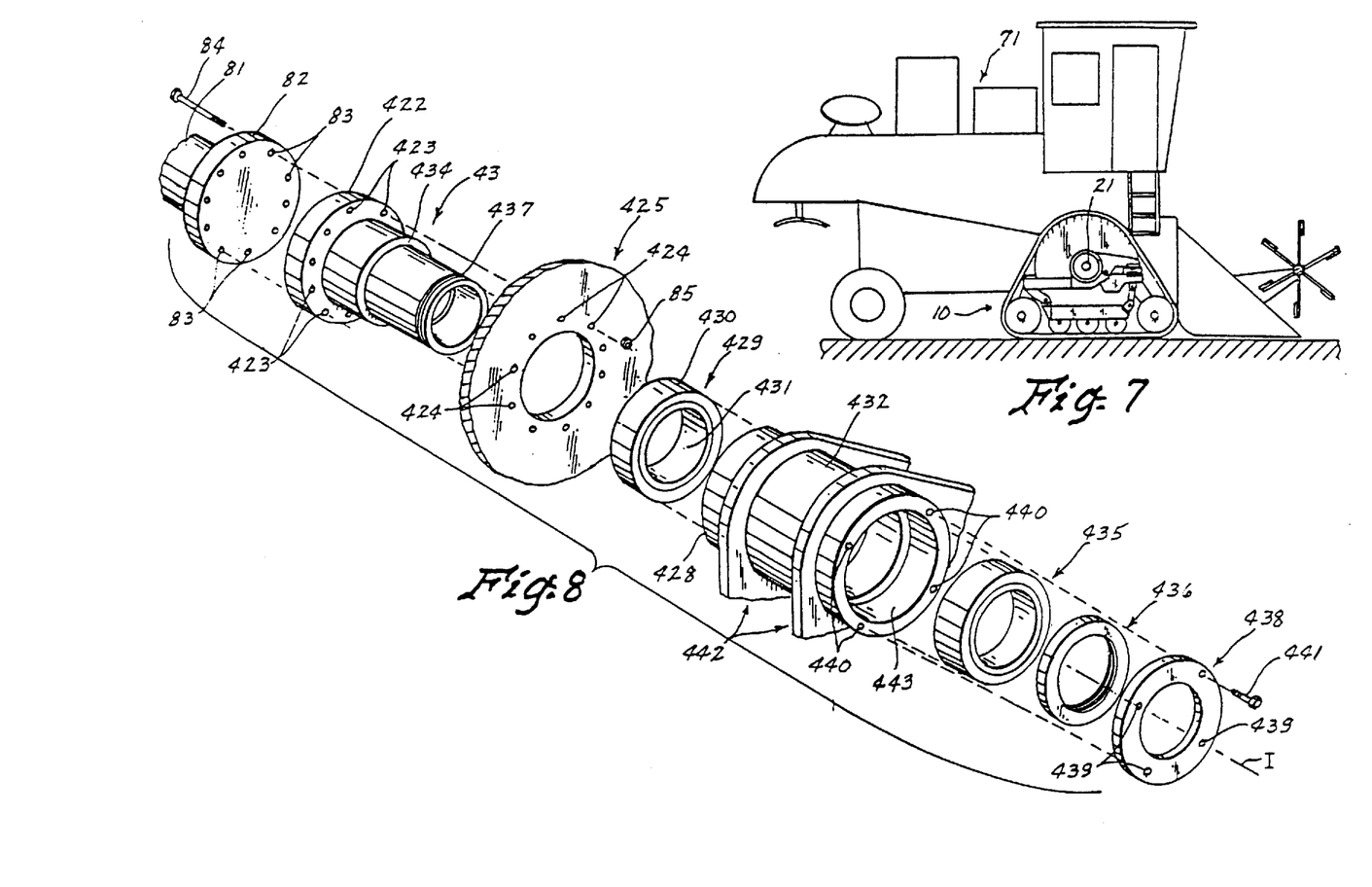
FIG. 7 is a side elevational view of a track suspension apparatus attached to an agricultural combine.
FIG. 8 is an exploded view of the primary frame, the drive wheel and the associated parts used to attach the track suspension device to the hub of an agricultural combine.

Referring now to the drawings, wherein like reference numerals designate identical or corresponding parts throughout the several views, FIG. 1, is a gernalized overhead plan view of a vehicle (11) employing a flexible track system (10) similar to that shown in U.S. Pat. No. 5,452,949 to Kelderman. The present invention (10) is shown in its intended mode of operation, in this case with one apparatus (10) attached to each side of the rear axle (12) of the vehicle (11) which can be an agricultural tractor. Further, FIG. 7 provides a side view of the apparatus (10) attached in the preferred way to a vehicle (71) of a generalized agricultural type which can be a combine. As will be made clear later in this description, the present invention (10) is driven by a powered axle from a vehicle (11, 71), and thus could be attached, for example, to a front axle (13, 21), a rear axle (12), or both.

Figure 2:
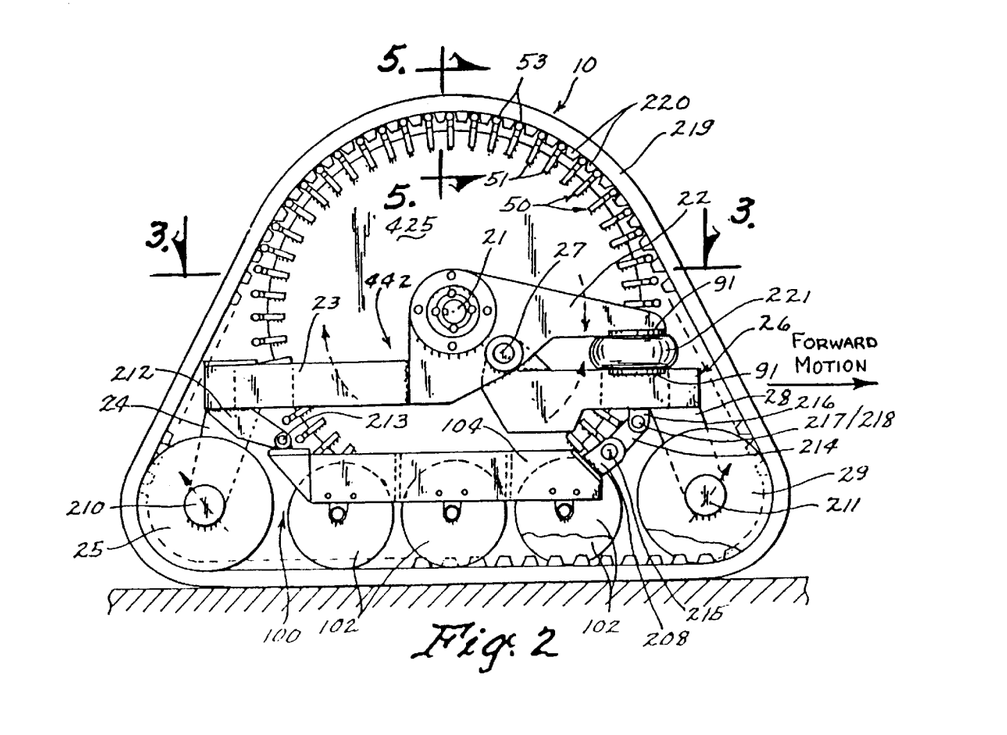
FIG. 2 is a side elevational view of one of the track suspension devices as viewed along line 2—2 of FIG. 1.

A side elevational view of the device (10) is shown in FIG. 2 was taken along line 2—2 in FIG. 1. The intended direction of motion is indicated by a solid arrow to the right of the apparatus (10). Thus references hereinafter to general relative directions such as "forward" or "lead" shall be understood to be toward the direction of motion whereas terms such as "rear" or "trailing" shall be understood to be away from the direction of motion. It is to be understood that the apparatus is capable of motion in either a forward or reverse direction so long as the axle (21) can be rotated by the vehicle (11, 71) in either way, as is the case with most conventional vehicles of the type with which this invention is concerned.

The rubber track system (10) provides a primary frame (442) which is attached to an axle (21) extending from the vehicle (11). Details and options for the manner of this attachment will be given below. The primary frame (442) generally comprises a forward portion (22) and a rear portion (23) which are provided for purposes of attachment and support to other elements of the apparatus (10). A trailing idler arm (24) is rigidly attached at one end to the rear portion (23) of the primary frame (442) and depends to meet at its other end a trailing idler wheel (25). The trailing idler wheel (25) is rotatably attached to the depending end of the trailing idler arm (24) with a first idler axle (210). The function of the trailing idler wheel (25) will be made more clear below.

A leading secondary frame (26) is pivotally attached to the primary frame (442) at a first pivot (27). At the forward extreme of the secondary frame (26), a leading idler arm (28) is rigidly attached to secondary frame (26) and depends to meet, in rotatable attachment, a leading idler wheel (29) via a second idler axle (211). The function of the leading idler wheel (29) will also be described below.

Figures 3, 4, 5, 6:
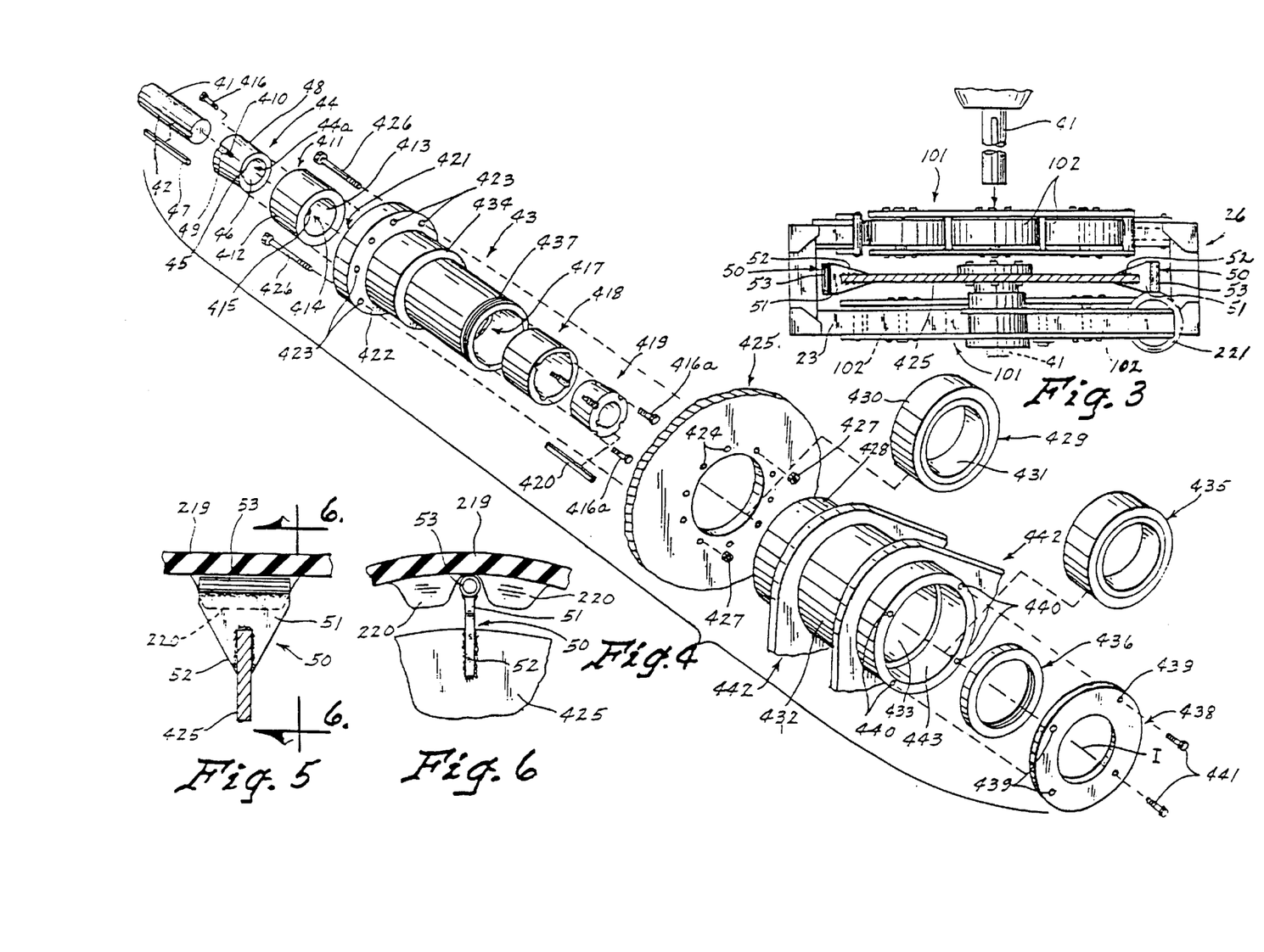
FIG. 3 is a cross-sectional view taken along line 3—3 of FIG. 2.
FIG. 4 is an exploded view of the primary frame on which the track suspension apparatus is mounted along with the drive wheel and all of the associated parts for connecting it to a grooved axle of an agricultural tractor.
FIG. 5 is an enlarged cross-sectional view taken along line 5—5 of FIG. 2.
FIG. 6 is a view taken along line 6—6 of FIG. 5.
Figure 9:
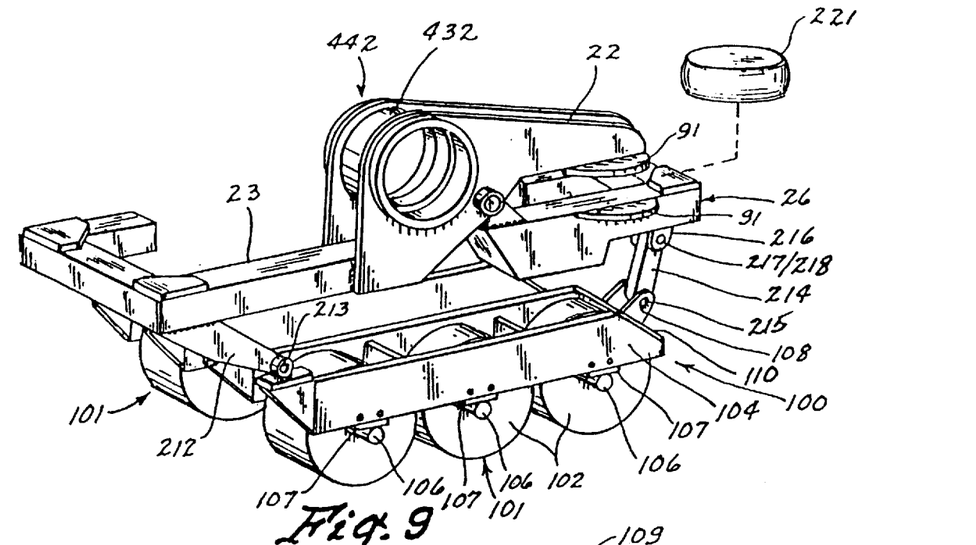
FIG. 9 is a perspective view of a shock absorbing suspension system of the present invention including mid-roller assemblies.
Figure 10:
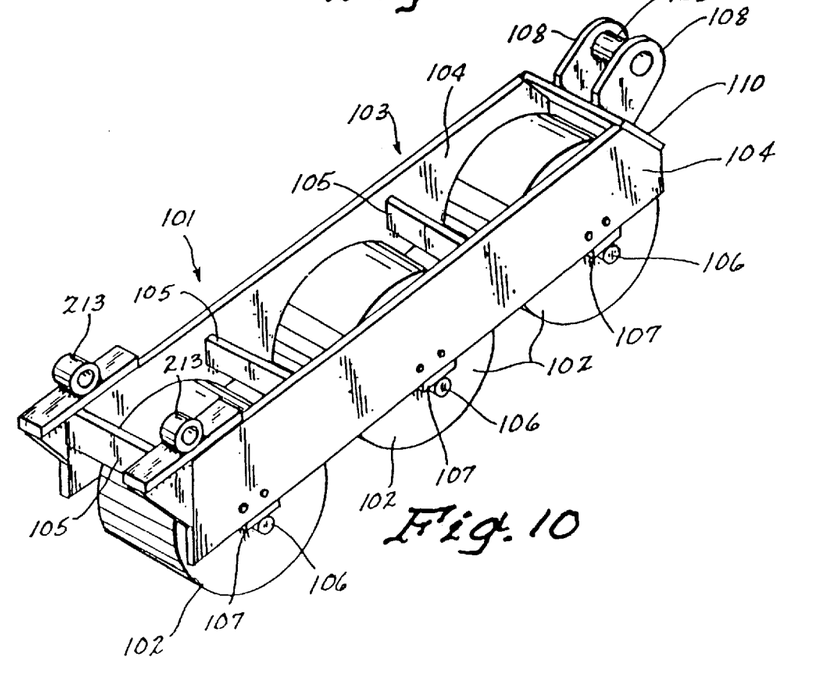
FIG. 10 is a perspective view of one of the two mid-roller assemblies used in the track suspension apparatus and as shown in FIG. 9.

A mid-roller assembly (100) comprises a plurality of sub assemblies (101) as shown in FIG. 9 and FIG. 3. A detail of a mid-roller sub-assembly (101) is shown in perspective view in FIG. 10. Each mid-roller sub-assembly generally comprises a plurality of cylindrical mid-rollers (102) and a frame (103) having generally flat, elongated side members (104). The sub-assembly frame (103) further comprises a plurality of cross supports (105) which span the distance between the side members (104) and connect them in a supporting fashion. Further, each mid-roller (102) is provided with a mid-roller axle (106) that is engaged and held fixedly on either side by bearing brackets (107) each of which depends from a fixed attachment to a side member (104). Thus the mid-rollers (102) are connected to the sub-assembly frame (103) and are allowed free rotation about their individual axles (106). The mid-roller sub-assembly frame (103) at one end further provides an angular cross plate (110) upon which are fixed a pair of angularly disposed support brackets (108). Between the extremities of the support brackets (108), a pivot pin (109) is held in a permanently fixed, transverse orientation relative to the mid-roller sub assembly frame (103).

Returning to FIG. 2, each mid-roller sub-assembly (101) is attached to the primary frame (442) at its rearward end by way of a rear connecting member (212). Each rear connecting member (212) is rigidly attached at one end to the rear portion (23) of the primary frame (442) and is at the other end pivotally connected to a mid-roller sub-assembly (101) at a second pivot (213).

At the forward end of each mid-roller sub-assembly (101), the pivot pin (109) is met by an intermediate connecting member (214), thereby forming a third pivot (215). At its opposite end, the intermediate connecting member (214) is positioned between a pair of depending support brackets (216) between which is a pin (217). The pin (217) passes through the intermediate connecting member (214) and thus forms a fourth pivot (218). The depending support brackets (216) are permanently fixed to the underside of the secondary frame (26).

About the perimeter of the present invention (10), an endless track (219) is provided, having on its outer surface an endless track pattern (14) (as partially seen in FIG. 1), and on its inner surface an endless series of transverse raised nubs (220). The track (219) is preferably constructed of a flexible yet durable material such as rubber. Motion of the track (219) is accomplished as follows.

A drive wheel (425) is provided for purposes of moving the track (219) about the periphery of the device (10) once rotation is provided by a powered axle (21). The drive wheel (425) has a plurality of radially disposed drive paddles (50) about its circumference.

FIG. 5 shows a rear view of a drive paddle (50) as seen along line 5—5 of FIG. 2 with the endless track (219) transected. FIG. 6 is a side view of FIG. 5 as seen along line 6—6. As is shown in these two illustrations, each drive paddle (50) comprises a generally flat support plate (51) having a tapered lower region (52) which is attached in a permanent way, such as by welding, to the outer edge of the drive wheel (425). Each drive paddle (50) further comprises a generally cylindrical end portion (53) which is permanently fixed along one side of its long aspect to the radially distal end of the support plate (51).

The cylindrical end portion (53) of each drive paddle (50) is of such a size and shape that it is easily received in the space between two adjacent transverse nubs (220). Furthermore, the drive paddles (50) are evenly spaced about the circumference of the drive wheel (425) in a way that allows continuous matching engagement of the drive paddles (50) with the spaces between the transverse nubs (220) as the drive wheel (425) is rotated and the track (219) is driven.

It should be pointed out here that the general structure of the present invention, specifically the drive wheel (425) being of a proportionally larger size relative to the device as a whole in conjunction with the drive wheel (425) being positioned such that it passes through the upper plane of the mid-roller assembly (100) is an improvement over the prior art as explained in U.S. Pat. No. 5,452,949 to Kelderman which is incorporated herein by reference. These factors allow more of the inner surface of the track (219) to be in contact with the drive wheel (425) at any one time thereby reducing the problem of slippage and further resulting in greater drive efficiency.

In a vehicle system having a flexible outer track, it is usually desirable to keep the tension of that outer track within a predetermined range. This is desirable because in order for the drive wheel (425) to effectively drive the track (219), the interior of the track (219) must be in firm contact with the drive paddles (50). An improved, cushioned ride for vehicle (11) having tracks (219) is accomplished by the present invention (10) through the use of an air bag or fluid control bladder (221) which is constructed of a durable, flexible material and is capable of being both inflated and deflated in a controlled way.

Referring now to FIG. 9 in addition to FIG. 2, it is shown that the fluid control bladder (221) is positioned between the forward portion (22) of the primary frame (442) and the secondary frame (26). A contact plate (91) is fixedly attached to both the primary frame (442) and the secondary frame (26). Both contact plates (91) are of a shape that conforms to that of that of the fluid control bladder (221) and thus create an expanded surface for contact with the fluid control bladder (221). This expanded surface allows for the fluid control bladder (221) to distribute its force against the primary frame (442) and secondary frame (26) more evenly and efficiently.

When the tension of the track (219) is disturbed, such as when the apparatus (10) encounters an irregularity in the surface of the ground (e.g., a rock), the relative position of the leading idler wheel (29) is caused to move in a direction indicated by the dashed line arrow through the second idler axle (211) (see FIG. 2). This movement causes simultaneous motion (all indicated by dashed line arrows) of the forward portion (22) and rear portion (23) of the primary frame (442), the secondary frame (26), and trailing idler wheel (25).

As the apparatus (10) continues over the ground irregularity, various motions of the aforementioned components cause their relative positions to change thereby continually causing changes in the tension of the track (219). The fluid control bladder (221) compensates against these changes by continually inflating or deflating against these relative movements.

It is well known in the art that vehicles which are in need of a tracked wheel apparatus may be of different types and manufacture, particularly with respect to the axles of such vehicles. Therefore, the present invention provides attachment means for a number of different axle types. For example, FIG. 4 provides an exploded view of a means for attachment of the present invention to a vehicle having a grooved axle (41). For purposes of orientation, the grooved axle (41) may be considered an extension of the vehicle to which the apparatus is attached.

The axle (41), having a groove (42), extends through the apertures of the components of FIG. 4 that are shown to be concentric about axis I, and is attached in the following way. A first lock bushing (44), having a tapered outer surface (48) and a longitudinal groove (45) along its cylindrical inner surface (46), is provided in addition to an elongated first key (47) for purposes of engaging the axle (41) in a locking fashion. With the axle (41) extended through the aperture (44a) of the first lock bushing (44), the first key (47) is inserted so as to be received simultaneously on one side by the groove (45) on the inner cylindrical surface (46) of the first lock bushing (44) and on the other side by the groove (42) of the axle (41). Thus engaged, the groove (42) of the axle (41) is aligned and locked with the groove (45) of the first lock bushing (44) and any rotation of the axle (41) about axis I causes equal rotation of the first lock bushing (44) about the same axis.

The tapered outer surface (48) of the first lock bushing (44) is further provided with a plurality of generally elongated, semi-cylindrical indentations (49), each having a partially threaded inner surface (410). A first lock hub (411) having a cylindrical outer surface (412) and a tapered inner surface (413) is disposed to receive the outer tapered surface (48) of the first lock bushing (44). In order to accomplish such reception, the first lock hub (411) further comprises a plurality of generally elongated, semi-cylindrical indentations (414), each with a partially threaded inner surface (415), which are of such number and arrangement as to match the generally elongated, semi-cylindrical indentations (49) of the tapered outer surface (48) of the first lock bushing (44). Thus, once engaged and properly aligned, the indentations (49) of the outer tapered surface (48) of the first lock bushing (44) and the indentations (414) of the inner tapered surface (413) of the first locking hub (411) form a plurality of fully threaded bores (not seen directly in FIG. 4 due to being an exploded view). With a matching threaded bolt (416) threadedly engaged in each fully threaded bore, the first lock bushing (44) and the first lock hub (411) are secured together.

The first lock hub (411) is positioned within a spindle (43) having a first aperture (421) which has a diameter equal to the outer diameter of the first lock hub (411). In order to prevent rotation of the first lock hub (411) with respect to the spindle (43), these two elements are joined in a permanent way, such as that provided by welding.

The spindle (43) further provides a second aperture (417) for receiving a second lock hub (418). The second lock hub (418), in addition to a second lock bushing (419), second elongated key (420), and additional threaded bolts (416a), all having identical functionality and form to, respectively, the first lock hub (411), first lock bushing (44), first elongated key (47), and threaded bolt (416), are symmetrically engaged in order to effect simultaneous rotation of the axle (41) and the spindle (43).

The spindle (43) further provides a flange (422) having a plurality of apertures (423) which are disposed to meet a drive wheel (425) having a matching plurality of apertures (424). The drive wheel (425) is shown in cutaway form for the sake of clarity. When the apertures (423) of the flange (422) are aligned with the apertures (424) of the drive wheel (425), an equally numbered plurality of threaded bolts (426) are extended simultaneously through both pluralities of apertures to meet an equal number of threaded nuts (427). With threaded engagement between the partially threaded bolts (426) and the threaded nuts (427), the flange (422) of the spindle (43) and the drive wheel (425) are secured together.

The spindle (43) is received by a first bearing (429) which has a stationary outer portion (430) and an inner portion (431) which is rotatable relative to the stationary outer portion (430). The stationary outer portion (430) of the first bearing (429) is received by a first race (not shown, but symmetric to a second race (443), shown and also described below) which is located on the inner surface of a spindle hub (432). As measured with respect to axis I, the width of the first bearing (429) and the first race are the same such that the first bearing (429) is trapped in fitting engagement on one side by a raised portion (433) of the interior of the spindle hub (432) and on the other side by a raised portion (434) of the spindle (43).

A second bearing (435) having structure and functionality identical (except as described below) to the first bearing (429) is provided for purposes of receiving the spindle (43) in a way which is symmetric to the first bearing (429) with respect to the spindle hub (432). The second bearing (435) is positioned within a second race (443) and is held in trapped engagement on one side by the raised portion (433) of the spindle hub (432); however, on the other side, the second bearing (435) is secured in place by a threaded spindle nut (436) which meets a threaded end portion (437) of the spindle (43) in threaded engagement. Thus configured, relative motion of the spindle hub (432) and spindle (43) in either direction along axis I is prevented while rotation of the spindle about axis I within the spindle hub (432) is facilitated.

A hub cap (438) having an internal seal (not shown) and a plurality of apertures (439) is aligned with a matching plurality of threaded bores (440) which are disposed around the periphery of the spindle hub (432) as viewed along axis I. With the immediately aforementioned components properly aligned, a plurality of threaded bolts is extended through the apertures (439) of the hub cap (438) into the plurality of threaded bores (440) wherein they are received in threaded engagement. Thus engaged, and in conjunction with its internal seal (not shown), the hub cap (438) provides protection for the components of the assembly which lie within the spindle hub (432) against such elements as dirt, dust, and moisture.

The spindle hub (432) is held in a fixed position relative to the primary frame (442) through welding or other permanent means. The primary frame (442), among other functions, provides support for the remainder of the apparatus. Thus, once engaged as described above, a vehicle having a grooved axle (41), may provide rotation about axis I of the drive wheel (425) relative to the primary frame (442) of the apparatus thereby effecting function of the apparatus and thus motion of the vehicle.

FIG. 8 illustrates a structure for attaching the present invention to a vehicle having an axle (81) with a flanged end (82). As is easily seen, this method of attachment is similar to that previously described for attachment to a vehicle having a grooved axle (41).

The flanged end or hub (82) of the axle (81) provides a plurality of apertures (83) about its periphery. A matching plurality of apertures (423) is also provided about the periphery of the flange (422) of the spindle (43). The drive wheel (425) is provided with a plurality of apertures (424) which match the apertures (423) of the spindle flange (422) as well as the apertures (83) of the flanged end or hub (82) of the axle (81). Once engaged, a plurality of threaded bolts (84) is extended through the triply aligned pluralities of apertures. A matching number of threaded nuts (85) meets the plurality of threaded bolts (84) in threaded engagement thereby securing together the flanged end (82) of the axle (81), the spindle (43), and the drive wheel (425). Thus, rotation of the axle about axis I effects simultaneous rotation of the drive wheel (425).

The remaining elements of FIG. 8, namely a first bearing (429), a spindle hub (432), the primary frame (442), a second bearing (435), a threaded spindle nut (436), a hub cap (438), and a plurality of threaded bolts (441), are all identical in form, function, and engagement to those elements previously described for use in attaching the apparatus to a vehicle having a grooved axle as illustrated in FIG. 4.

Thus, once properly engaged, a vehicle having an axle (81) with a flanged end (82) may gain use of the present invention with equal effectiveness to that of a vehicle having a grooved axle (41).

Figures 11, 12, 13:
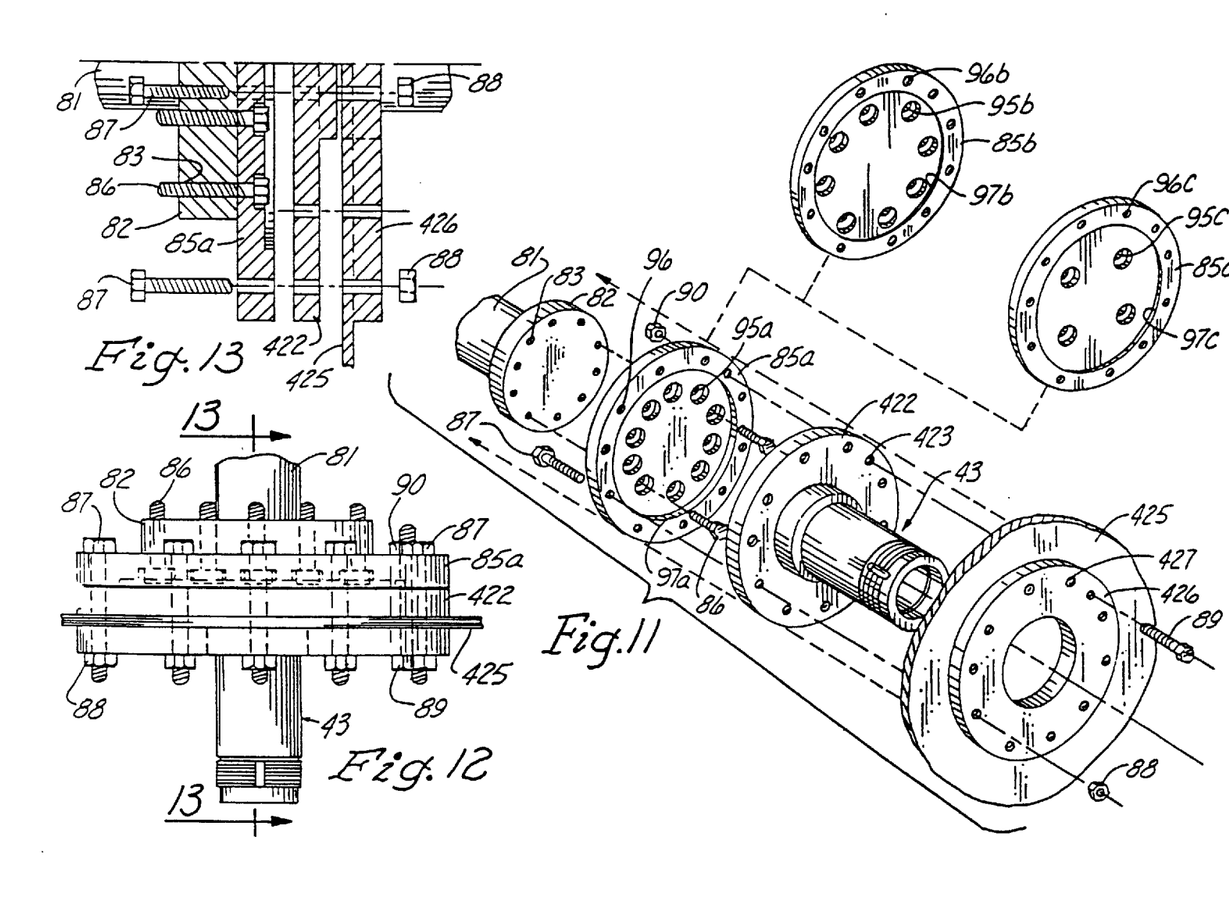
FIG. 11 is an exploded perspective view showing another embodiment of a universal attaching system for tracks including interchangeable plates adaptable to specific but different vehicles.
FIG. 12 is a top plan view of the structure of FIG. 11 all bolted together.
FIG. 13 is a partial cross-sectional view taken along line 13—13 of FIG. 12 and showing the parts exploded.

Referring now to FIGS. (11, 12 & 13) another preferred embodiment of the invention is shown. A driven shaft (81) is shown rigidly connected to a hub (82). Hub (82) has a plurality of threaded openings (83) disposed therein. The problem is that this hub (82) and the pattern and size of the threaded openings (83) is different for most combines from one brand to another. Also, some larger horsepowered tractors have this type of hub (82) and the pattern and size of threaded openings (83) also varies from one brand of tractor to another. Therefore, there is a need for a way to univerally attach the drive wheel (425) to the hub (82), there being no solution for this problem in the prior art.

A plurality of interchangeable connector plates (85a, 85b, & 85c) are shown in FIG. 11 and the configuration of the connector plate is essentially controlled by the particular type of hub (82) and the size and configuration of the threaded openings (83) therein. For example, certain John Deere tractors or combines may have one pattern while those for J.I. Case or other manufactureres may have a different configuration and size for threaded openings (83). Therefore, it is an aspect of this invention to use interchangeable plates (85a, 85b, or 85c) or any other number required to adapt to any particular manufacturer's hub (82). The connector plates (85a) all have an identical outer pattern for openings (96) because they all will bolt to an identical plate for (22) having openings (423) that coincide in size and spacing with the openings (96) in adaptor plates (85a, 85b, & 85c).

The pattern of recessed openings (95a, 95b, & 95c), however, are dictated by the particular manufacturer's hub (82) and the patterns are clearly shown by comparing connector plates (85a, 85b, & 85c). The shoulder (97a, 97b, & 97c) on connector plates (85a, 85b, & 85c) respectively provides a space inside to hold the head of bolts (86) which are received into the openings (95a, 95b, or 95c) and are threaded into the openings (83) in hub (82).

Spindle (43) is connected to the track assembly (10), for example, as shown in FIG. 8 an entire track can be lifted, for example with a forklift, and placed so that the plate (422) is adjacent the connector plate (85a). Then bolts (87 & 89) can be utilized as shown in FIG. 11 to connect plate (422) with the drive wheel (425) through openings (427) and plate (426). The bolts (87) and nuts (88) secure all of these members together as shown in FIG. 12 as well as bolt (89) and nut (90). Consequently, the vehicle attached to hub (82) can be utilized, for example, on a combine during the harvest season and then after it is no longer needed, the track units (10) could be removed and placed on a tractor having a hub like (82) during other times of the season perhaps by merely changing to an appropriate connector plate such as (85b or 85c).

Another major advantage is that one track system (10), with various connector plates, can be used on any one of many implements such as combines or tractors. This allows the dealer to stock perhaps only one pair of track units (10) and then when the customer orders these track units for a particular vehicle, the dealer could then just merely provide a pair of appropriate adaptor plates like (85a, 85b, or 85c), for example if the customer wishes to use the tracks on only one vehicle. If the customer wishes to later sell it, it would have a high market value because it would not only be marketable to persons with the same type of agricultural vehicle as its owner, but could be marketed to practically anyone owning large agricultural vehicles by merely buying an appropriate pair of connector plates. This is in contrast to the trend in the industry which dedicates the tracks to a particular type, size and brand of vehicle and is built custom-made for that tractor or combine or the like. These track units custom-made for a particular vehicle, therefore, do not have the versitility by a customer to switch from a tractor or a combine and do not have the market value associated with the present invention which can be used on practically any vehicle by merely making an appropriate pair of adaptor plates (85).

In the claims, means-plus-function clauses are intended to cover the structures described herein as performing the recited function and not only structural equivalents but also equivalent structures. Thus although a nail and a screw may not be structural equivalents in that a nail employs a cylindrical surface to secure wooded parts together, whereas a screw employs a helical surface, in the environment of fastening wooden parts, a nail and a screw may be equivalent structures.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. In a track suspension apparatus for mounting on a vehicle which has an vehicle hub with a first pattern of connection points thereon spaced about the vehicle hub axis, the track suspension apparatus including (a) a frame; (b) a continuous flexible track with upper and ground-engaging lower lengths; (c) a drive wheel structure rotatably mounted with respect to the frame and having a second pattern of connection points thereon, and further having an upper circumferential portion engaging the upper track length and a lower circumferential portion spaced above the lower track length; (d) a leading idler assembly attached to the frame and having a leading idler arm and a leading idler wheel engaging the track and rotatably mounted to the leading idler arm; (e) a trailing idler arm and a trailing idler wheel engaging the track and rotatably mounted to the trailing idler arm; and (f) a mid-roller assembly in engagement with the track lower length and attached to one of the idler arms, the improvement comprising a hub-mounting apparatus including:

a removable adapter with a third pattern of connection points thereon corresponding to the first pattern and a fourth pattern of connection points thereon corresponding to the second pattern;

a plurality of vehicle hub connectors attaching the adapter to the vehicle hub via the first and third patterns of connection points; and a plurality of adapter connectors attaching the adapter to the drive wheel structure via the second and fourth patterns of connection points, thereby facilitating mounting of the track suspension apparatus.

2. The apparatus of claim 1 wherein the drive wheel structure includes a drive wheel having the second pattern of connection points and a spindle having a spindle hub that includes a fifth pattern of connection points corresponding with the fourth pattern of connection points on the removable adapter and the second pattern of connection points on the drive wheel, the plurality of adapter connectors serving to secure together the adapter the spindle hub and the drive wheel.

3. The apparatus of claim 1 wherein:

the drive wheel structure includes a drive wheel having a fifth pattern of connection points and a spindle having a spindle hub that includes the second pattern of connection points and a sixth pattern of connection points corresponding to the fifth pattern of connection points, the second pattern of connection points located between the sixth pattern of connection points and the axis of the spindle hub; and a plurality of drive wheel connectors attaches the drive wheel to the spindle hub via the fifth and sixth patterns of connection points.

* * * * *